(12) United States Patent
Nakai

(10) Patent No.: US 7,505,669 B2
(45) Date of Patent: Mar. 17, 2009

(54) CONTENT REPRODUCTION APPARATUS

(75) Inventor: Eiji Nakai, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 719 days.

(21) Appl. No.: 10/465,728

(22) Filed: Jun. 19, 2003

(65) Prior Publication Data

US 2003/0235400 A1    Dec. 25, 2003

(30) Foreign Application Priority Data

Jun. 21, 2002    (JP)    ............................. 2002-180714

(51) Int. Cl.
*H04N 5/91*    (2006.01)

(52) U.S. Cl. ...................................................... 386/46

(58) Field of Classification Search ................... 386/70, 386/82, 125, 126
See application file for complete search history.

(56) References Cited

U.S. PATENT DOCUMENTS

| | | | | |
|---|---|---|---|---|
| 4,742,479 | A | * | 5/1988 | Kloker et al. ................ 708/491 |
| 5,249,148 | A | * | 9/1993 | Catherwood et al. ........ 708/491 |
| 5,584,038 | A | * | 12/1996 | Papworth et al. .............. 712/23 |
| 5,636,224 | A | * | 6/1997 | Voith et al. ................... 714/701 |
| 6,363,470 | B1 | * | 3/2002 | Laurenti et al. .............. 711/220 |
| 6,434,748 | B1 | * | 8/2002 | Shen et al. ..................... 725/89 |
| 6,642,939 | B1 | * | 11/2003 | Vallone et al. .............. 715/721 |
| 6,647,479 | B1 | * | 11/2003 | Laws .......................... 711/170 |
| 7,263,280 | B2 | * | 8/2007 | Bullock et al. .............. 386/124 |

* cited by examiner

Primary Examiner—Thai Tran
Assistant Examiner—Hung Q Dang
(74) Attorney, Agent, or Firm—Gerald T. Bodner

(57) ABSTRACT

A content reproduction apparatus includes a hard disk. An MPEG-PS into which an I picture is intermittently inserted is circularly written into an MPEG file formed on the hard disk. In addition, index data capable of specifying at least the I picture is circularly written into an INDEX file formed on the hard disk. A CPU detects the I picture from a head portion of the MPEG-PS based on the index data stored in the INDEX file, and reproduces the MPEG-PS rendering the detected I picture the starting picture.

9 Claims, 16 Drawing Sheets

(A)

(B)

(C)

(A) RMS < CRMS (B) RMS > CRMS

CONTENT REPRODUCTION APPARATUS

BACKGROUND OF THE INVENTION

1. Field of the Invention

The present invention relates to a content reproduction apparatus. More specifically, the present invention relates to a content reproduction apparatus that is adapted to a hard disk video recorder, and reproduces a video content circularly recorded in a first file, and having a reference screen intermittently defined, based on index information of the reference screen circularly recorded in a second file.

2. Description of the Prior Art

In conventional such a kind of a hard disk recorder, received program video signal and program sound signal are encoded into a video ES and an audio ES (ES: Elementary Stream) in accordance with an MPEG format, and the video ES and the audio ES are packetized so as to be converted into a video PES and an audio PES (PES: Packetized Elementary Stream). When an MPEG-PS (PS: Program Stream) is generated as a result of a multiplexing of the video PES and the audio PES, an MPEG file including the MPEG-PS is recorded into a hard disk. In addition, index information (frame size, frame type, off-set from a head, and time stamp) of respective pictures is created so that an I picture, a B picture, and a P picture forming the video ES are specified, and then, an index file including the index information is recorded into the hard disk.

However, in a case that the MPEG format adopts a VBR format (VBR: Variable Bit Rate), a data size of the MPEG-PS varies depending upon a nature of the program video. In contrary, the data size of the index information is fixed. Therefore, if the file size of the MPEG file and the index file are previously defined, and the MPEG-PS and the index information are updated within the MPEG file and the index file in a ring manner, a head of the MPEG-PS and a head of the index information become not corresponded with each other. Thus, it may be probable that the MPEG-PS is not reproduced from the head portion.

SUMMARY OF THE INVENTION

Therefore, it is a primary object of the present invention to provide a content reproduction apparatus capable of reproducing from a head portion a video content stored in a file.

According to the present invention, a content reproduction apparatus that reproduces a video content circularly written in a first file, and having reference screens intermittently defined, based on index information of the reference screens circularly written in a second file, comprises: a specifier for specifying one of the reference screens from a head portion of the video content based on the index information; and a reproducer for reproducing the video content rendering the reference screen specified by the specifier a starting screen.

The video content having reference screens intermittently defined is circularly written in the first file, and the index information of the reference screens is circularly written in the second file. The specifier specifies one of the reference screens from a head portion of the video content based on the index information of the second file, and the reproducer reproduces the video content rendering the specified reference screen a starting screen.

Thus, as a result of one of the reference screens being specified based on the index information of the second file, it becomes possible to reproduce from the head portion the video content stored in the first file in which a writing is circularly performed.

Preferably, the index information includes off-set values, which indicate distances from a head of the video content to the reference screens, respectively. At this time, the specifier detects the head portion of the video content remained in the first file, detects one of the off-set values from the second file, and specifies the reference screen from the head portion of the video content based on the detected head portion and the off-set value.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
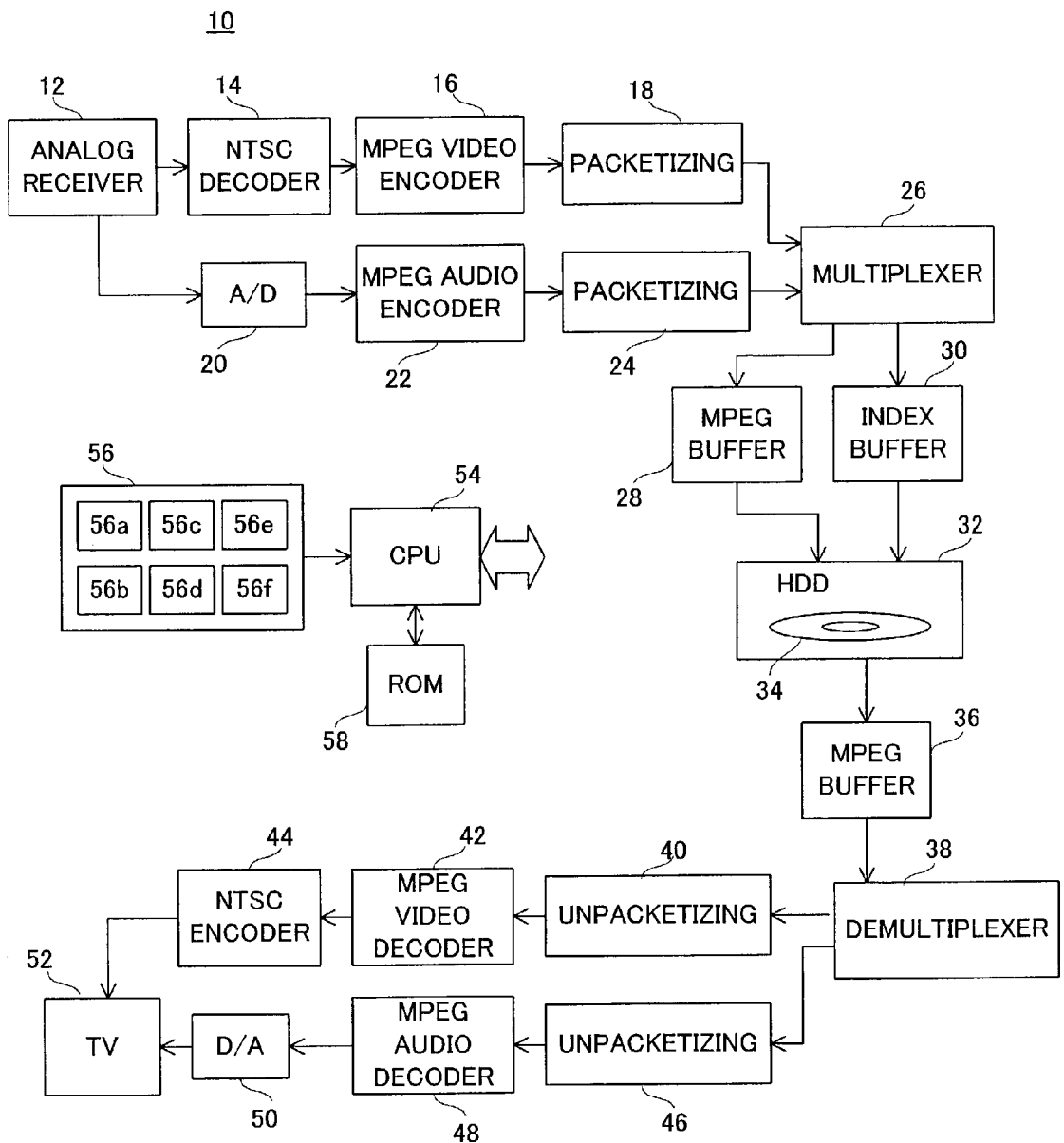
FIG. 1 is a block diagram showing one embodiment of the present invention.

Referring to FIG. 1, a hard disk video recorder 10 of this embodiment includes an analog receiver 12. The analog receiver 12 receives a high-frequency television signal from an antenna (not shown), and outputs a composite video signal and an audio signal of a desired channel. The composite video signal is applied to an NTSC decoder 14, and the audio signal is applied to an A/D converter 20.

The NTSC decoder 14 decodes the applied composite video signal so as to output video data. The decoded video data is converted into a video ES by an encoding process of an MPEG video encoder 16, and the converted video ES is converted into a video PES by a packetizing process of a packetizing circuit 26. On the other hand, the A/D converter 20 subjects the audio signal to an A/D conversion, and applies the audio data to an MPEG audio encoder 22. The audio data is converted into an audio ES by an encoding of the MPEG audio encoder 22, and the audio ES is converted into an audio PES by a packetizing of the packetizing circuit 24.

A multiplexer 26 multiplexes the video PES and the audio PES output from the packetizing circuits 18, and 24 so as to generate an MPEG-PS, and generate index data of video frames included in the MPEG-PS. The MPEG-PS and the index data are applied to an HDD 32 via an MPEG buffer 28 and an INDEX buffer 30. The HDD 32 generates on a hard disk 34 an MPEG file into which the MPEG-PS is stored, and an INDEX file into which the index data is stored. Thus, a video, and a sound or voices of the desired program are recorded into the hard disk 34.

When the MPEG-PS is reproduced by the HDD 32 from the MPEG file recorded in the hard disk 34, the MPEG-PS is applied to a demultiplexer 38 via the MPEG buffer 36. The demultiplexer 38 extracts a video PES packet and an audio PES packet from the applied MPEG-PS, and applies the video PES packet to an unpacketizing circuit 40, and the audio PES packet to an unpacketizing circuit 46, respectively. Each of the unpacketizing circuits 40, and 46 converts the video PES and the audio PES into a video ES, and an audio ES, and applies the converted video ES, and the audio ES to an MPEG video decoder 42, and an MPEG audio decoder 48.

The MPEG video decoder 42 decodes the applied video ES so as to generate video data, and applies generated video data to an NTSC encoder 44. The vide data is converted into a composite video signal by the NTSC encoder 44, and the converted composite video signal is output to a television receiver 52. As a result, a reproduced video of the desired program is displayed on a monitor screen of the television receiver 52.

The MPEG audio encoder 48 decodes the applied audio ES so as to generate audio data. Generated audio data is converted into an analog audio signal by a D/A converter 50, and the converted audio signal is output to the television receiver 52. As a result, a reproduced sound or voices of the desired program is output from a speaker of the television receiver 52.

Figure 2:
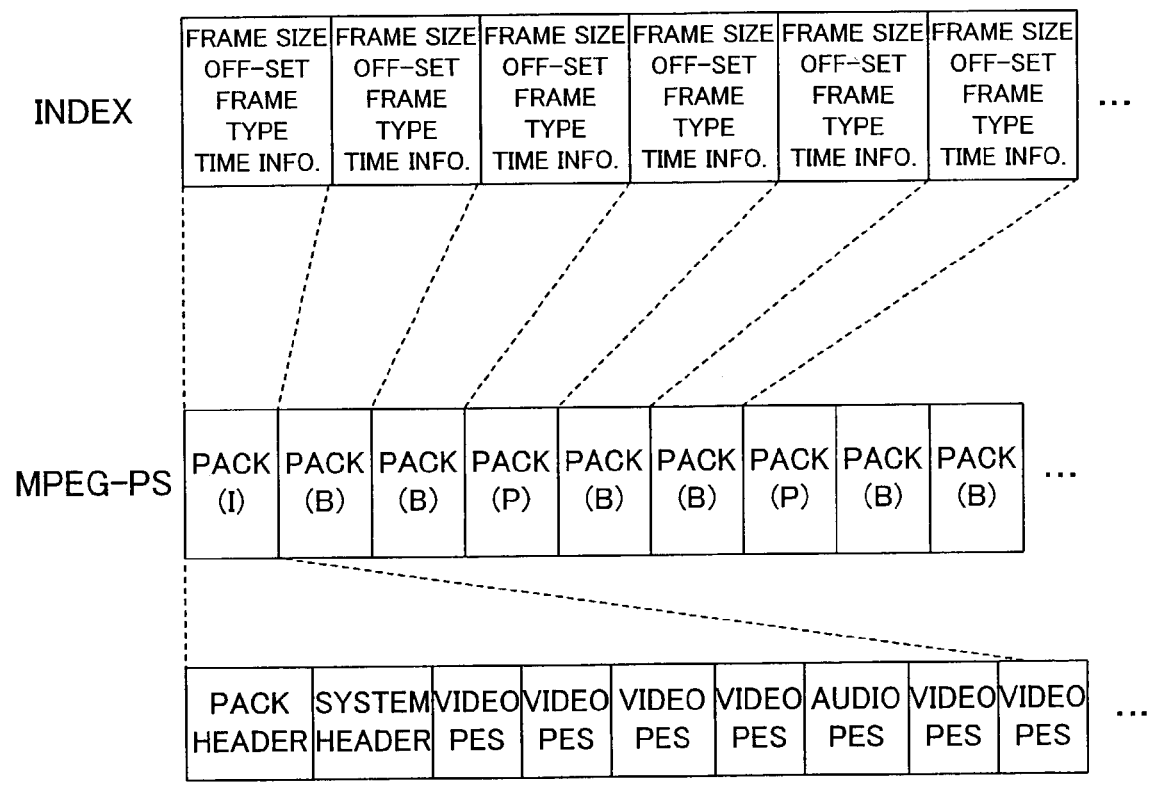
FIG. 2 is an illustrative view showing one example of data structure of index data, and MPEG-PS.

The MPEG-PS and the index data have data structure as shown in FIG. 2. According to FIG. 2, the MPEG-PS is formed of a plurality of packs, and a pack header, a system header, a video PES packet, and an audio PES packet are included in each pack.

Regarding an MPEG format, three frame types are defined such as an I picture, a B picture, and a P picture, and the video PES packet forming one picture is not to bridge over a different pack. That is, a plurality of the video PES packets forming the I picture in a certain screen is included in the same packet, a plurality of the video PES packets forming the B picture in a certain screen is included in the same pack, and a plurality of the video PES packets forming the P picture in a certain screen is included in the same pack.

Furthermore, if the system header is added only to a first pack forming the MPEG-PS, a condition of the MPEG format is satisfied. However, the MPEG video encoder 24 of this embodiment adopts a VBR system, and a bit rate varies depending on each picture. Thus, the system header is assigned to each pack, and bit rate information is loaded into the system header.

It is noted that the audio PES packet is intermittently inserted among the video PES packets in such a manner that the reproduced video and the reproduced sound or voices are synchronized with each other.

The index data is assigned to each of the pictures by 24 bytes. With using the 24 bytes, a frame size value of the corresponding picture, an off-set value from a head of the MPEG-PS, a frame type, and time information are expressed.

The hard disk video recorder 10 of this embodiment has a constant recording function. When the function is turned-on, a program recording is started at the same time as inputting a power source. File names of "RINGBUFF.mpg" and "RIBGBUFF.ndx" are assigned to the MPEG file, and the INDEX file created on the hard disk 34 at a time of the constant recording, respectively.

However, a size of the MPEG file created by the constant recording is defined in advance, and if a size of the fetched MPEG-PS becomes larger than the defined size, a preceding MPEG-PS is overwritten by the MPEG-PS that follows. That is, the MPEG file becomes a so-called ring file at a time that the size of the MPEG-PS exceeds the defined size. If the MPEG file becomes the ring file, the INDEX file also becomes the ring file, and the index data written in the INDEX file is overwritten by the index data that follows.

If a recording start key 56c provided on an operation panel 56 is operated when the constant recording is under progress, a terminating process is applied to the MPEG file and the INDEX file created by the constant recording. That is, lacking data is complemented to the MPEG file or the INDEX file in such a manner that a corresponding relationship between a last frame of the MPEG-PS stored in the MPEG file, and last 24 bits of the index data stored in the INDEX data is maintained.

Upon completion of the terminating process, the MPEG file and the INDEX file are closed, and a ring information file for specifying a ring state of the respective files is created on the hard disk 34. A file name of "RINGBUFF.loop" is assigned to the ring information file. The MPEG file, the INDEX file, and the ring information file created by the constant recording are subjected to a change of the file name for a normal saving. More specifically, the file name of the MPEG file is changed from "RINGBUFF.mpg" to "SAN**.mpg", the file name of the INDEX file is changed from "RINGBUFF.ndx" to "SAN.ndx", and the file name of the ring information file is changed from "RINGBUFF.loop" to "SAN.loop" (**:file number). As a result of the file name being changed, each of the MPEG file, the INDEX file, and the ring information file is changed from a temporary file to a normal file.

Upon completion of the file name change, a normal recording is started. Normal file names of "SAN**.mpg" and "SAN**.ndx" are assigned the MPEG file, and the INDEX file created by the normal recording. It is noted that in the MPEG file and the INDEX file created by the normal recording, the MPEG-PS and the index data are not to be overwritten in a ring manner.

If a recording suspension key 56d on the operation panel 56 is operated after the normal recording is started, the same terminating process as described above is executed toward the MPEG file and the INDEX file created by the normal recording. Then, the MPEG file and the index file are closed. Upon completion of closing the file, a recording mode is moved from the normal recording to the constant recording.

It is noted that if an arbitrary MPEG file is selected by a menu key 56a provided on the operation panel 56, and a reproduction key 56b is operated when the constant recording or the normal recording is under progress, the MPEG file is reproduced in addition to the recording process.

A CPU 54, when a whole system is started by an input of the power source, carries out flowcharts shown in FIG. 3-FIG. 10 based on a control program stored in a ROM 58. It is noted that a start of the whole system allows the MPEG-PS and the index data to be output from the multiplexer 26. The MPEG- PS is accumulated into the MPEG buffer 28, and the index data into the INDEX buffer 30, respectively.

Figure 3:
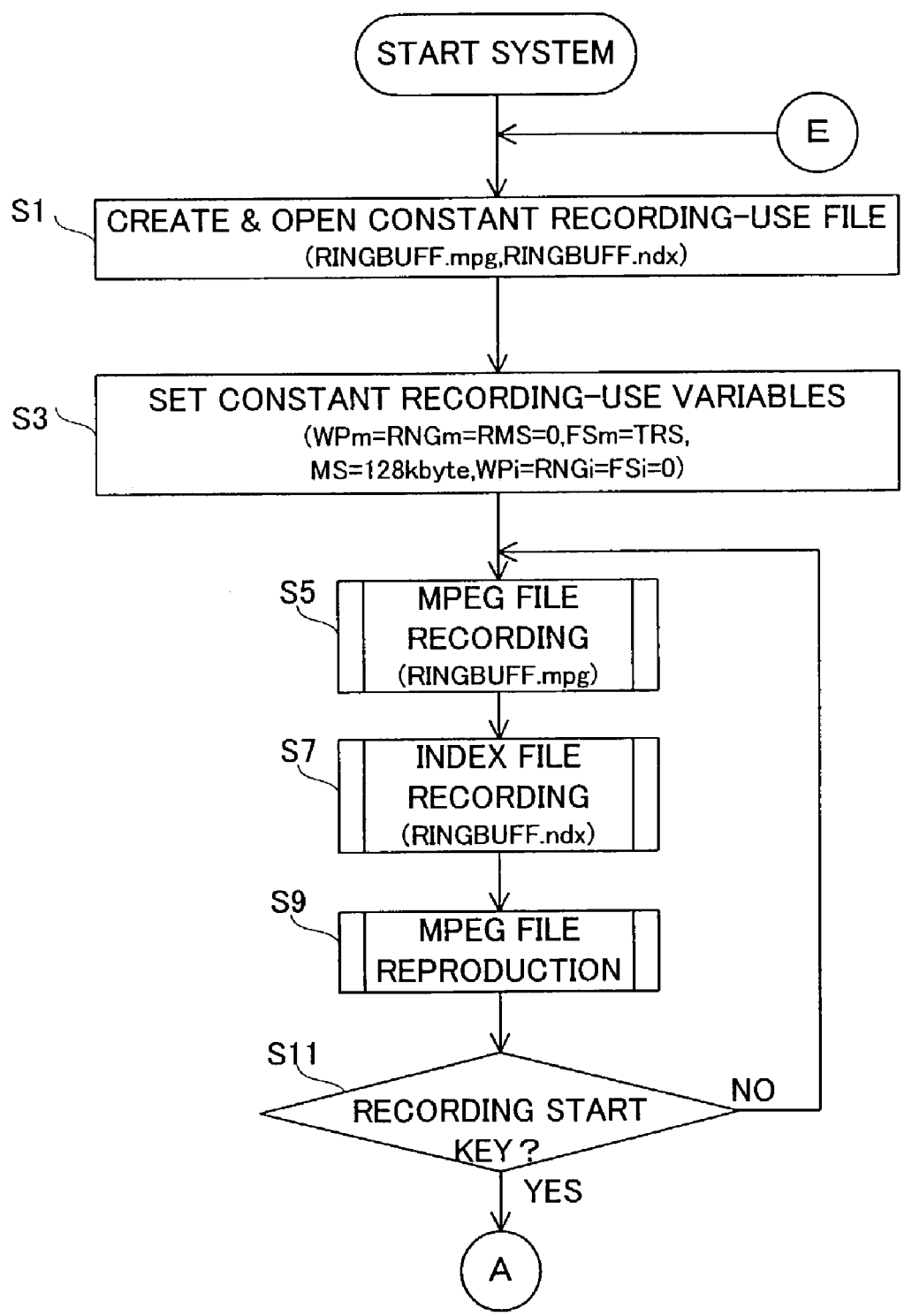
FIG. 3 is a flowchart showing one portion of an operation of FIG. 1 embodiment.
Figure 4:
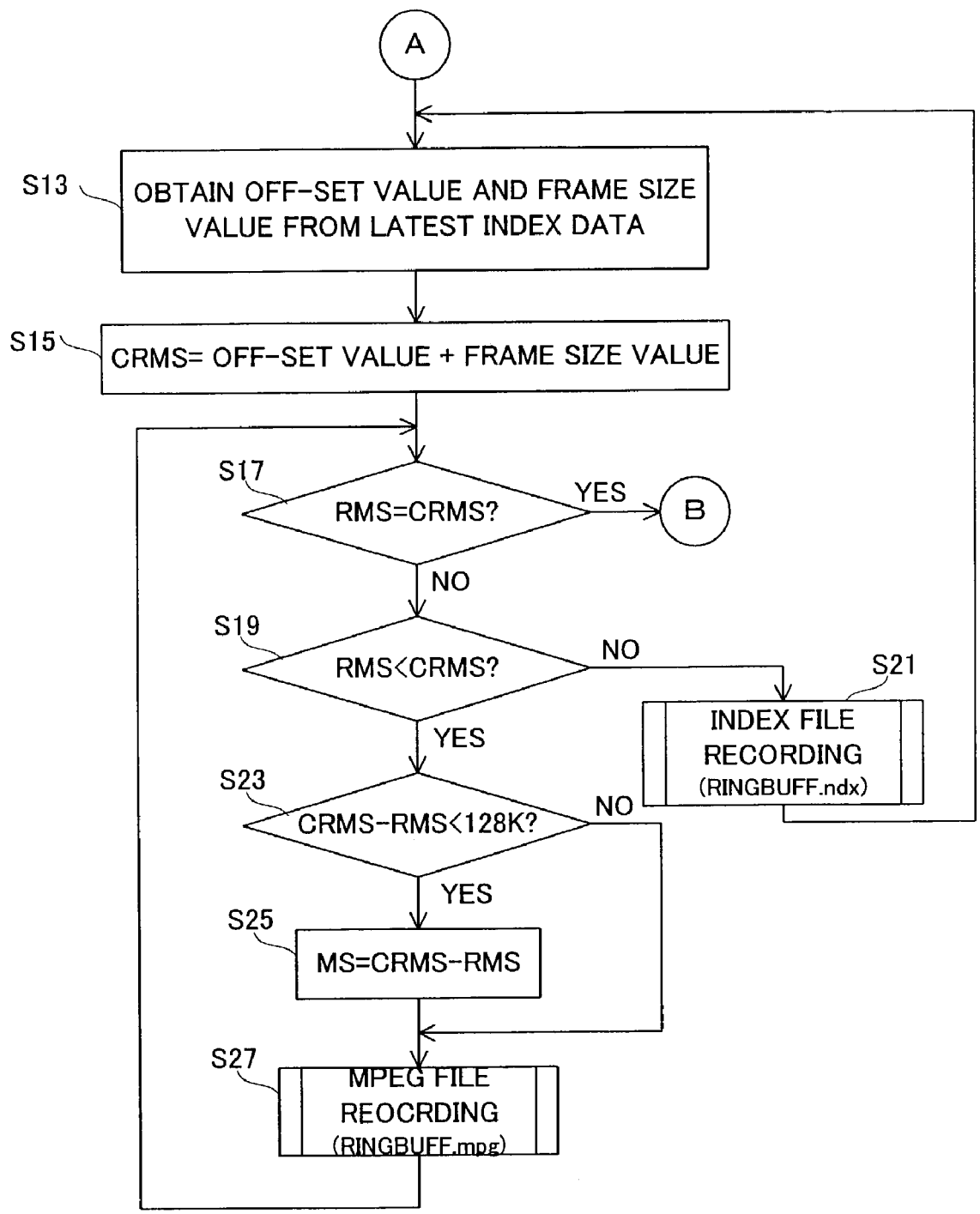
FIG. 4 is a flowchart showing another portion of the operation of FIG. 1 embodiment.

In a step S1 shown in FIG. 3, in addition to creating a file for the constant recording, the created file is opened. More specifically, the MPEG file having the file name of "RING-BUFF.mpg", and the INDEX file having the file name of "RINGBUFF.ndx" are newly created on the hard disk 34, and the created MPEG file and the INDEX file are opened.

In a succeeding step S3, variables for the constant recording are set. More specifically, regarding the MPEG file, a variable WPm showing a writing location, a variable RNGm showing the number of times of overwriting the MPEG-PS, and a variable RMS showing a size of the recorded MPEG-PS are set to "0", a variable FSm showing a file size is set to a predetermined value TRS, and a variable MS showing a writing size of each writing of the MPEG-PS is set to 128K bytes. In addition, regarding the INDEX file, a variable WPi showing the writing location, a variable RNGi showing the number of overwritings, and a variable FSi showing the file size are set to "0".

It is noted that the variable RMS, more specifically, is an added value of the MPEG-PS recorded in the MPEG file. Therefore, its numerical value continues to increase along the writing, and is not to decrease by the overwriting of the MPEG file.

An MPEG file recording is carried out in a step S5, and an INDEX file recording is carried out in a step S7. This allows the MPEG-PS accumulated in the MPEG buffer 28, and the index data accumulated in the INDEX buffer 30 to be applied to the HDD 32, and written into the MPEG file and the INDEX file created in the step S1, respectively. In addition, as a result of the writing of the MPEG-PS, the variable WPm and the RMS are updated, and the variable RNGm is updated if required. Furthermore, as a result of the writing of the index data, the variable WPi is updated, and the variable RNGi and FSi are updated if required.

In a step S9, a reproduction of the MPEG file arbitrarily selected by an operator is carried out. It is determined whether or not the recording start key 56c is operated in a step S11, and if NO, the processes of steps S5-S9 are repeated. However, if YES, the terminating process is carried out in steps S13-S27.

Firstly, in the step S13, the offset value and the frame size value are obtained from the latest 24 bytes of the index data stored in the INDEX file. The latest 24 bytes are 24 bytes preceding to the variable WPi. In addition, the offset value to be obtained indicates a distance from a head of the fetched MPEG-PS to a head of the picture corresponding to the latest 24 bytes of the index data, and the frame size value to be obtained indicates a size of the picture corresponding to the latest 24 bytes of the index data. Such the offset value and the frame size value are added with each other so as to evaluate an added value CRMS in the step S15, and the added value CRMS is compared with the variable RMS in the steps of S17 and S19.

Figure 16:
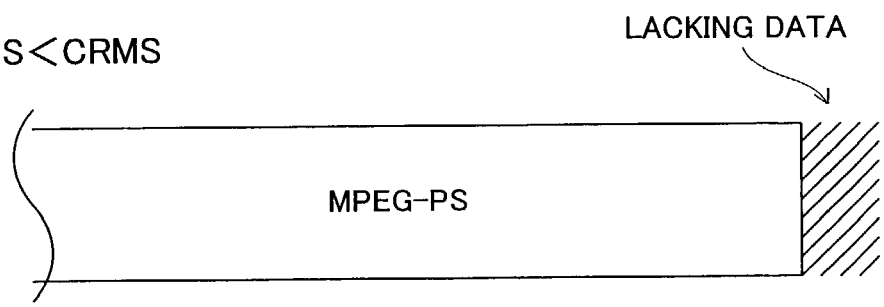
FIG. 16 is an illustrative view showing a further portion of the operation of FIG. 1 embodiment.
Figure 16:
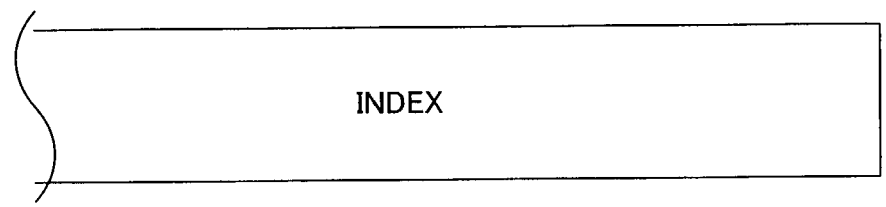
Figure 16:
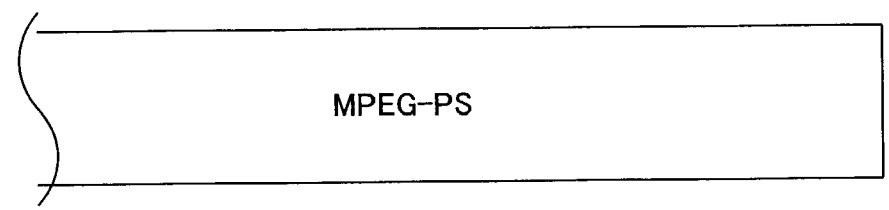
Figure 16:
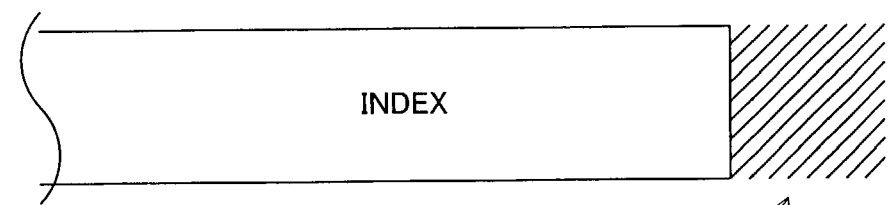

The variable RMS is an added value of the MPEG-PS recorded in the MPEG file, and if a corresponding relationship between a last frame written in the MPEG file, and the latest 24 bytes of the index data written in the INDEX file is retained, the added value CRMS and the variable RMS become coincident with each other. In other words, when the variable RMS falls below the added value CRMS, a portion of the MPEG-PS is lacking as shown in FIG. 16(A), and when the variable RMS exceeds the added value CRMS, a portion of the index data is lacking as shown in FIG. 16(B).

Due to this, if a condition that RMS is larger than (>) CRMS is established, NO is determined in the step S19, and the INDEX file recording is executed in the step S21. upon completion of the process of the step S21, the process returns to the step S13.

On the other hand, if a condition that RMS is smaller than (<) CRMS is established, YES is determined in the step S19, and it is determined whether or not a difference value "CRMS-RMS" between the added value CRMS and the variable RMS is smaller than 128K bytes. Then, if larger than or equal to 128K bytes, the process directly advances to a step S27. However, if smaller than 128K bytes, the variable MS is updated to the difference value "CRMS-RMS" in a step S25 before advancing to the step S27. The MPEG file recording process is carried out in the step S27, and upon completion of the process, the process returns to the step S17.

When the lacking data is complemented by such the process, and if the variable RMS is coincident with the added value CRMS, the process advances from the step S17 to a step S29 so as to suspend the MPEG video encoder 16 and the MPEG audio encoder 22 shown in FIG. 1. As a result of this suspension process, an output of the MPEG-PS from the multiplexer 26 is suspended.

In steps S31, and S33, the MPEG file and the INDEX file for the constant recording are closed. In a step S35, in a case that the MPEG file and the INDEX file are ring files, the ring information file in which the above-described variables FSm, WPm, RNGm, FSi, WPi, and RNGi are stored is created. The file name of "RINGBUFF.loop" is assigned to a created ring information file, and the ring information file is saved into the hard disk 34.

In a step S37, regarding the MPEG file and the INDEX file for the constant recording, the file name of "RING-BUFF.mpg" is changed to "SAN**.mpg", and "RING-BUFF.ndx" is changed to "SAN.loop". Furthermore, when the ring information file is created, the file name of the ring information file is changed from "RINGBUFF.loop" to "SAN.loop". The MPEG file, the INDEX file, and the ring information file obtained as a result of the constant recording are to be normally saved in the hard disk 34** by way of a change of the file name.

In a step S39, a file for the normal recording is created, and a created file is opened. More specifically, the MPEG file having the file name of "SAN**.mpg", and the INDEX file having the file name of "SAN.ndx" are newly created on the hard disk 34**, and the created MPEG file and INDEX file are opened. It is noted that a new file number is assigned to the file names of the newly created MPEG file and INDEX file.

In a succeeding step S41, variables for the normal recording are set. More specifically, regarding the MPEG file, the variables WPM, RNGm, and RMS are set to "0", and the variable FSm is set to a predetermined value RRS, and the variable MS is set to 128K bytes. In addition, regarding the INDEX file, the variables WPi and RNG are set to "0".

This is different from the variable setting in the step S3 in that the predetermined value RRS is set to the variable FSm instead of the predetermined value TRS, and the variable FSi showing a size of the INDEX file is constant. It is noted that the predetermined value RRS is by far larger than the predetermined value TRS, and the MPEG file for the normal recording is not to become the ring file.

In steps S43-S47, the same processes as the above-described steps S5-S9 are executed. However, a writing destination of the MPEG-PS in the step S43, and a writing destination of the index data in the step S45 are the MPEG file and the INDEX file created in the step S39.

In a step S49, it is determined whether or not the recording suspension key 56d is operated, and if NO, the processes of the steps S43-S47 are repeated. In contrary thereto, if YES is determined, the terminating process is executed in steps S51-S65. It is noted that the processes of the steps S51-S65 are the same as the above-described steps S13-S27 except that a writing destination of the lacking data is the MPEG file or the INDEX file for the normal recording, and therefore, duplicated descriptions are herein omitted.

Upon completion of the terminating process, the MPEG file and the INDEX file for the normal recording are closed in steps S67 and S69, and then, the process returns to the step S1 so as to resume the constant recording.

It is noted that the MPEG file and the INDEX file created by the last constant recording are normally saved by way of a change of the file name so that the MPEG file and the INDEX file for the constant recording this time are newly created in the step S1.

Figure 6:
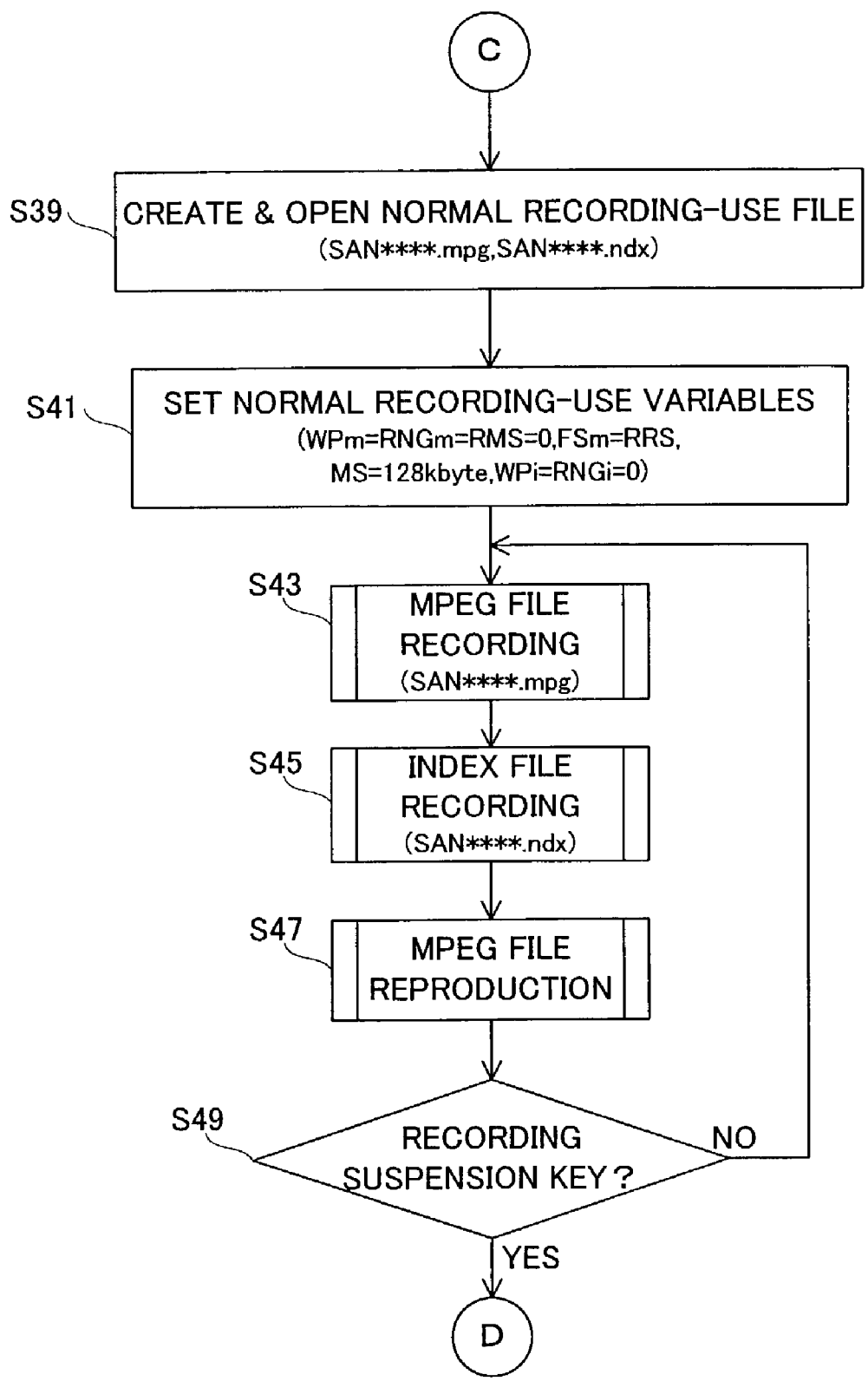
FIG. 6 is a flowchart showing a further portion of the operation of FIG. 1 embodiment.
Figure 7:
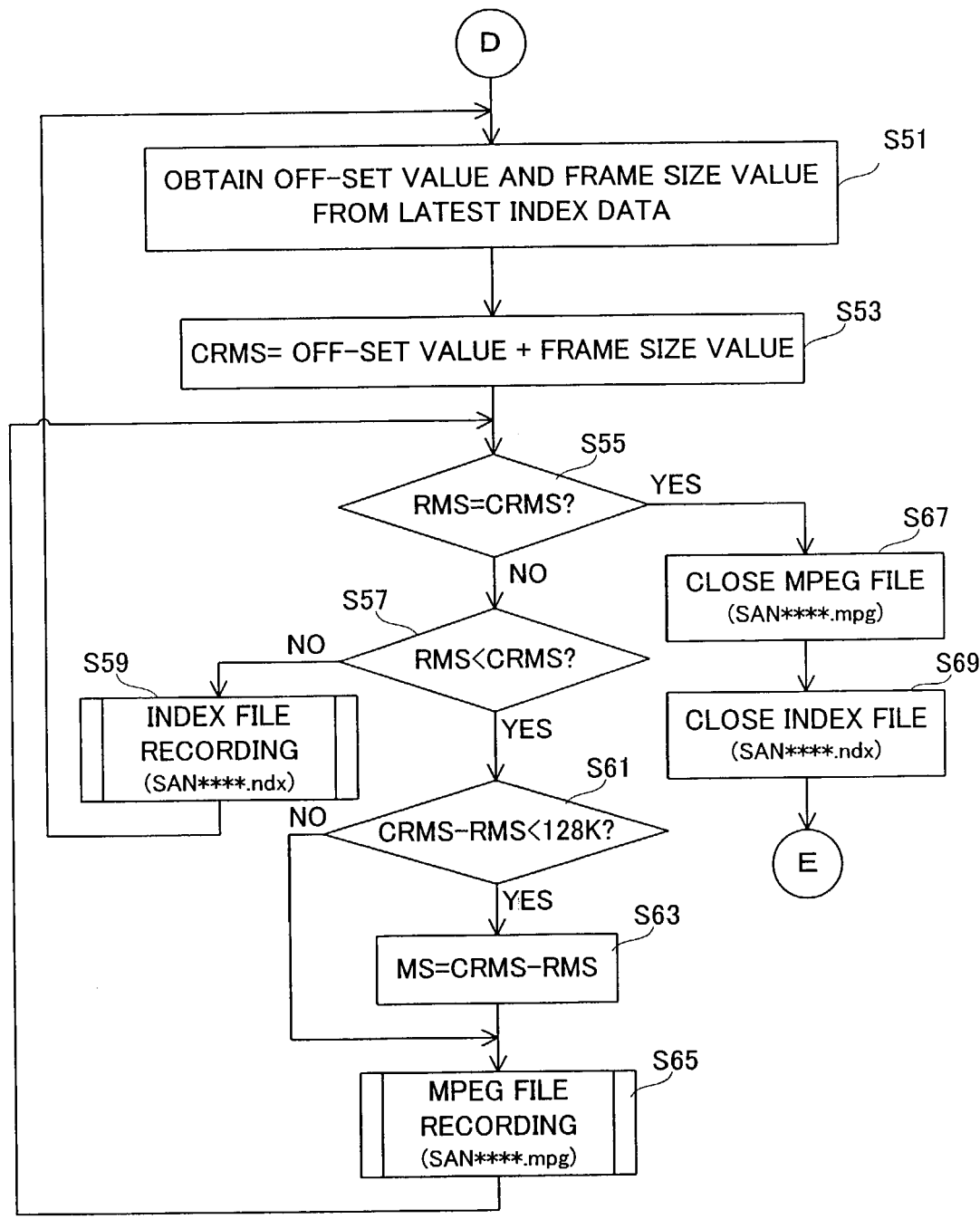
FIG. 7 is a flowchart showing another portion of the operation of FIG. 1 embodiment.
Figure 8:
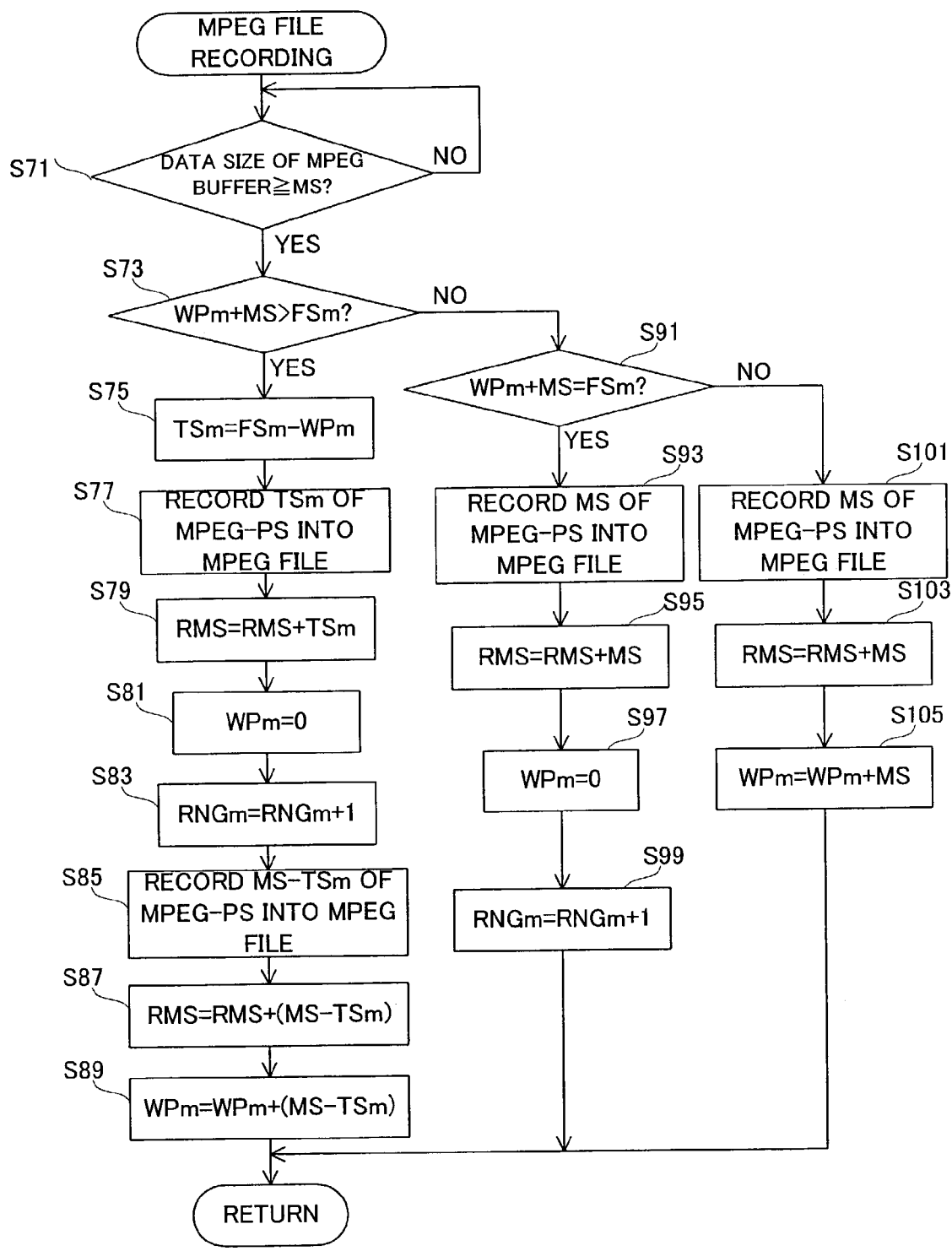
FIG. 8 is a flowchart showing the other portion of the operation of FIG. 1 embodiment.

The recording process of the MPEG file in the step S5 shown in FIG. 3 or the step S43 shown in FIG. 6 follows a flowchart shown in FIG. 8. Firstly, a size of the MPEG-PS accumulated in the MPEG buffer 30 is compared with the variable MS in a step S71, and when the size becomes equal to or larger than the variable MS, YES is determined. In steps S73 and S91, the added values of the variable MS and WPm are compared with the variable FSm. More specifically, it is determined whether or not a condition that WPm+MS>FSm is established in the step S73, and whether or not a condition that WPm+MS=FSm is established in the step S91.

Figure 13:
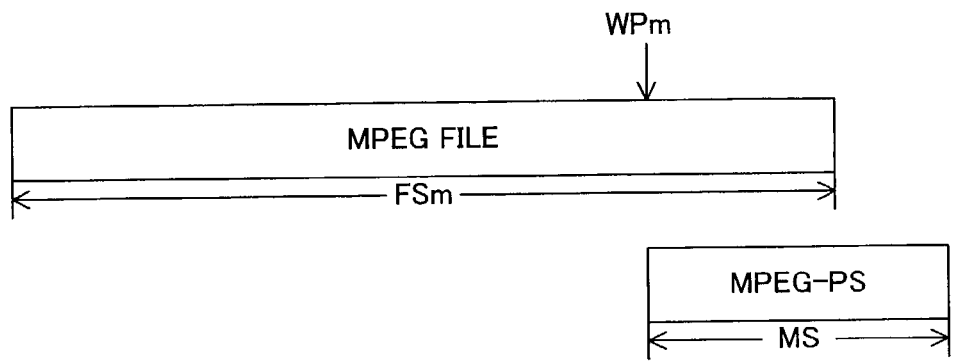
FIG. 13 is an illustrative view showing one portion of the operation of FIG. 1 embodiment.
Figure 13:
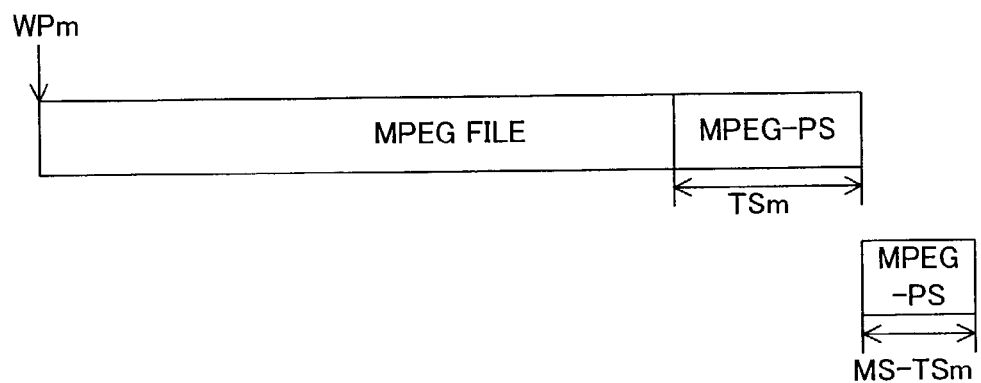
Figure 13:
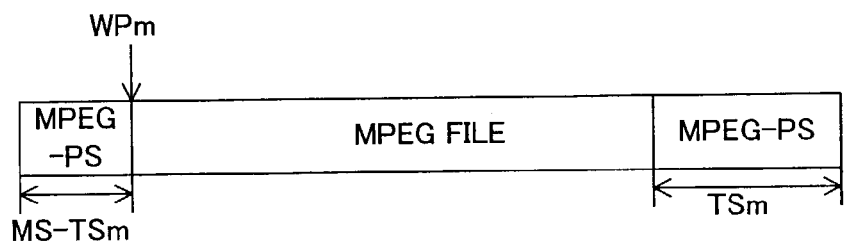

As shown in FIG. 13(A), if it is not possible to store the MPEG-PS, which has the size corresponding to the variable MS, in a location subsequent to a location corresponding to the variable WPm of the MPEG file, a condition that WPm+MS>FSm is established. At this time, the process advances from the step S73 shown in FIG. 8 to a step S75 so as to calculate a file size TSm from a location corresponding to the variable WPm to a last location (=FSm−WPm). In a step S77, the MPEG-PS corresponding to the calculated size TSm is written in a location subsequent to a location corresponding to the variable WPm of the MPEG file, the variable TSm is added to the variable RMS in a step S79, and the variable WPm is set to "0" in a step S81. A recording condition of the MPEG file and a location of the variable WPm are developed from FIG. 13(A) to FIG. 13(B).

The variable RNGm is incremented in a step S83, and the MPEG-PS of a size corresponding to "MS-TSm" is written into the MPEG file in a step S85. Since the variable WPm is "0", the MPEG-PS is overwritten from a head of the MPEG file. "MS-TSm" is added to the variable RMS in a step S87, and "MS-TSm" is added to the variable WPm in a step S89. A recording condition of the MPEG file, and a location of the variable WPm are developed from FIG. 13(B) to FIG. 13(C). Upon completion of the process of the step S89, the process returns to a routine on a higher hierarchy.

Figure 14:
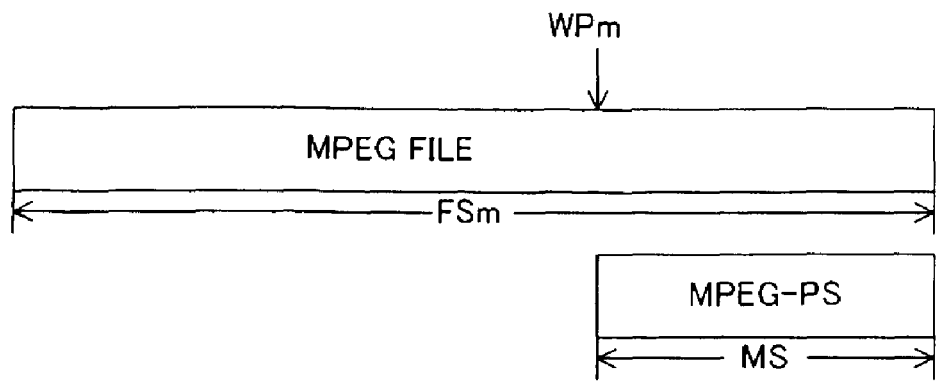
FIG. 14 is an illustrative view showing another portion of the operation of FIG. 1 embodiment.
Figure 14:
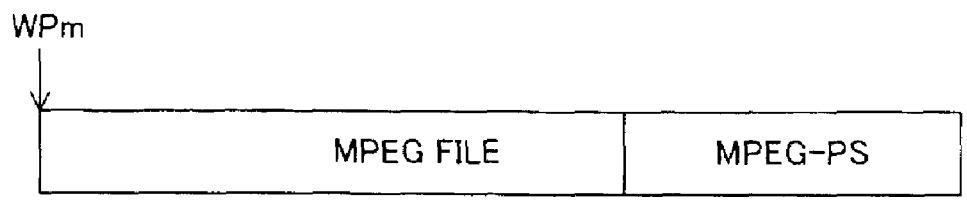

As shown in FIG. 14(A), when a size corresponding to the variable MS is equal to a capacity from a file location corresponding to the variable WPm to an end of the file, a condition of WPm+MS=FSm is established. At this time, the process advances from a step S91 shown in FIG. 8 to a step S93 so as to write the MPEG-PS having a size corresponding to the variable MS in a location subsequent to a location corresponding to the variable WPm of the MPEG file. The variable MS is added to the variable RMS in a step S95, the variable WPm is rendered "0" in a step S97, and the variable RNGm is incremented in a step S99. A recording condition of the MPEG file, and a location of the variable WPi are developed from FIG. 14(A) to FIG. 14(B). Upon completion of the process of the step S99, the process returns to a routine on a higher hierarchy.

Figure 15:
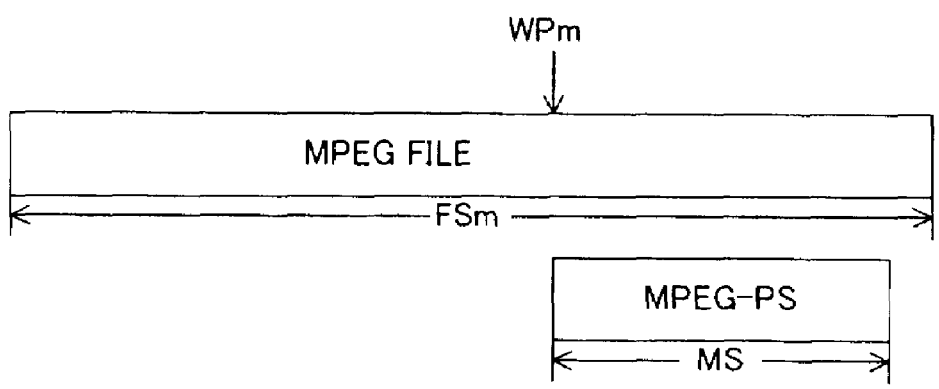
FIG. 15 is an illustrative view showing the other portion of the operation of FIG. 1 embodiment.
Figure 15:

As shown in FIG. 15(A), when a size corresponding to the variable MS is smaller than a capacity from a file location corresponding to the variable WPm to the end of the file, neither condition of WPm+MS>FSm nor WPm+MS=FSm established. At this time, NO is determined in the step S91, the same processes as in the steps S93 and S95 are carried out in steps S101 and S103, and the variable MS is added to the variable WPm in a step S105. A recording condition of the MPEG file is developed from FIG. 15(A) to FIG. 15(B). Upon completion of the process of the step S105, the process returns to a routine on a higher hierarchy.

It is noted that the predetermined value RRS is by far larger than the predetermined value TRS as described above. Therefore, when the process moves from the step S43 shown in FIG. 6 to a subroutine shown in FIG. 8, the steps S101-S105 are always executed so that the variable RNGm is not to be updated.

Figure 9:
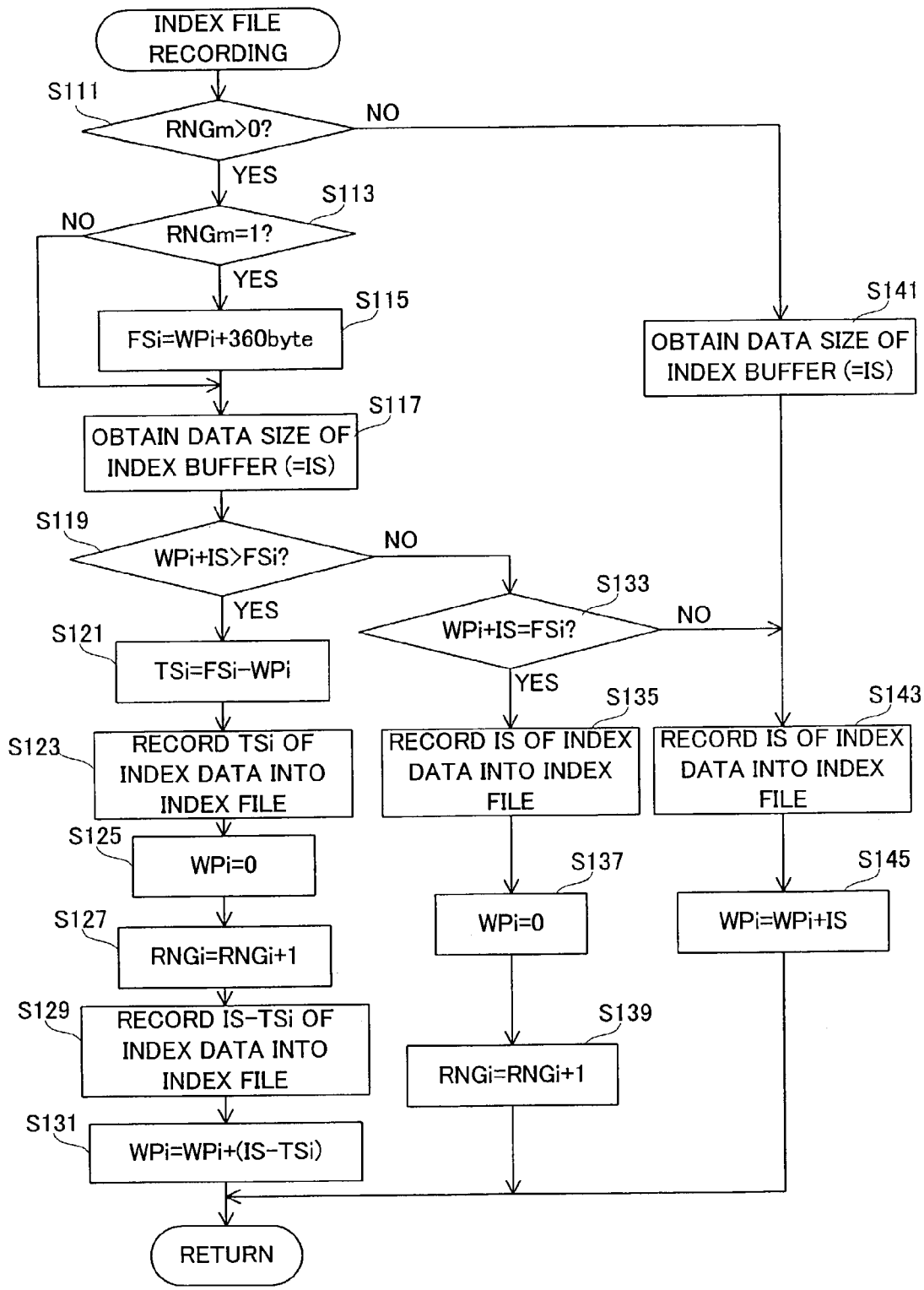
FIG. 9 is a flowchart showing a further portion of the operation of FIG. 1 embodiment.

An INDEX file recording process in the step S7 shown in FIG. 3 or in the step S45 shown in FIG. 6 follows a subroutine shown in FIG. 9. Firstly, a value of the variable RNGm is determined in steps S111 and S113. If the variable RNGm is "0", the process advances to a step S141 so as to obtain a size IS of the index data accumulated in the INDEX buffer 30, write the index data corresponding to the size IS in a location subsequent to a location corresponding to the variable WPi of the INDEX file in a step S143, and add the size IS to the variable WPi in a step S145. Upon completion of the step S145, the process returns to a routine on a higher hierarchy.

If the variable RNGm is "1", YES is determined in the step S113, and the process advances to a step S117 via an updating process of the variable FSi in a step S115. If the variable RNGm is larger than or equal to "2", the process moves from the step S113 to the step S117.

In the step S115, more specifically, "WPi+360 bytes" is set as a variable FPi. It is when the MPEG file is subjected to a first-time overwriting that the variable RNGm indicates "1", and at this time, a size of the INDEX file is defined as "WPi+360 bytes". Since a size of the index data equal to one frame is 24 bytes, a size that a margin of 15 frames (=1 GOP) is added to the present variable WPi is rendered a size of the INDEX file as a result of the process in the step S115.

In steps that follow the step S117, the same process as in the above-described MPEG recording process is carried out. More specifically, it is determined whether or not a condition of WPi+IS>FSi is established in a step S119, it is determined whether or not a condition of WPi+IS=FSi is established in a step S133, and then, the process advances to a different step depending on respective determination results.

If YES is determined in the step S119, a file size TSi (=FSi−WPi), which is from a location corresponding to the variable WPi to the end location, is calculated in a step S121. The index data corresponding to the calculated size TSi is written in a location subsequent to a location corresponding to the variable WPi of the INDEX file in a step S123, and the variable WPi is set to "0" in a step S125. A variable RNGi is incremented in a step S127, the index data having a size corresponding to "IS-TSi" is written in the INDEX file in a step S129. Since the variable WPi is "0", the index data is overwritten from a head of the INDEX file. "IS-Tsi" is added to the variable WPi in a step S131, and then, the process returns to a routine on a higher hierarchy later.

If YES is determined in a step S133, the process advances to a step S135 so as to write the index data having a size corresponding to the variable IS in a location subsequent to a location corresponding to the variable WPi of the INDEX file. The variable WPi is rendered "0" in a step S137, and the variable RNGm is incremented in a step S139. Upon completion of the process in the step S139, the process returns to a routine on a higher hierarchy.

If NO is determined in the step S133, the index data having a size corresponding to the variable IS is written in a location subsequent to a location corresponding to the variable WPi of the INDEX file in a step S143. Then, the size IS is added to the variable WPi in a step S145, and the process returns to a routine on a higher hierarchy.

It is noted that the predetermined RRS is by far larger than the predetermined TRS, and the variable RNGm is not to become a value other than "0" so that the processes of steps S141-S145 are always executed when the process moves from the step S45 shown in FIG. 6 to a subroutine shown in FIG. 9.

Figure 5:
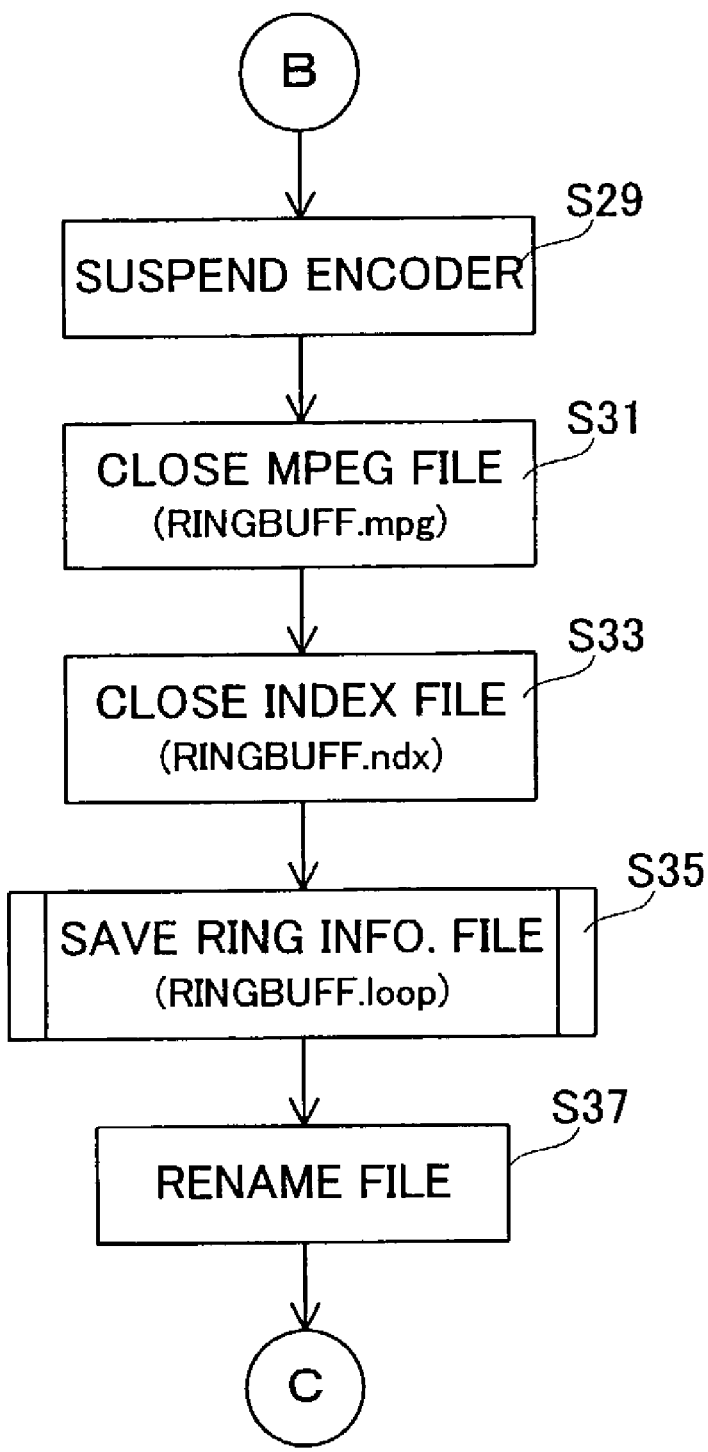
FIG. 5 is a flowchart showing the other portion of the operation of FIG. 1 embodiment.
Figure 10:
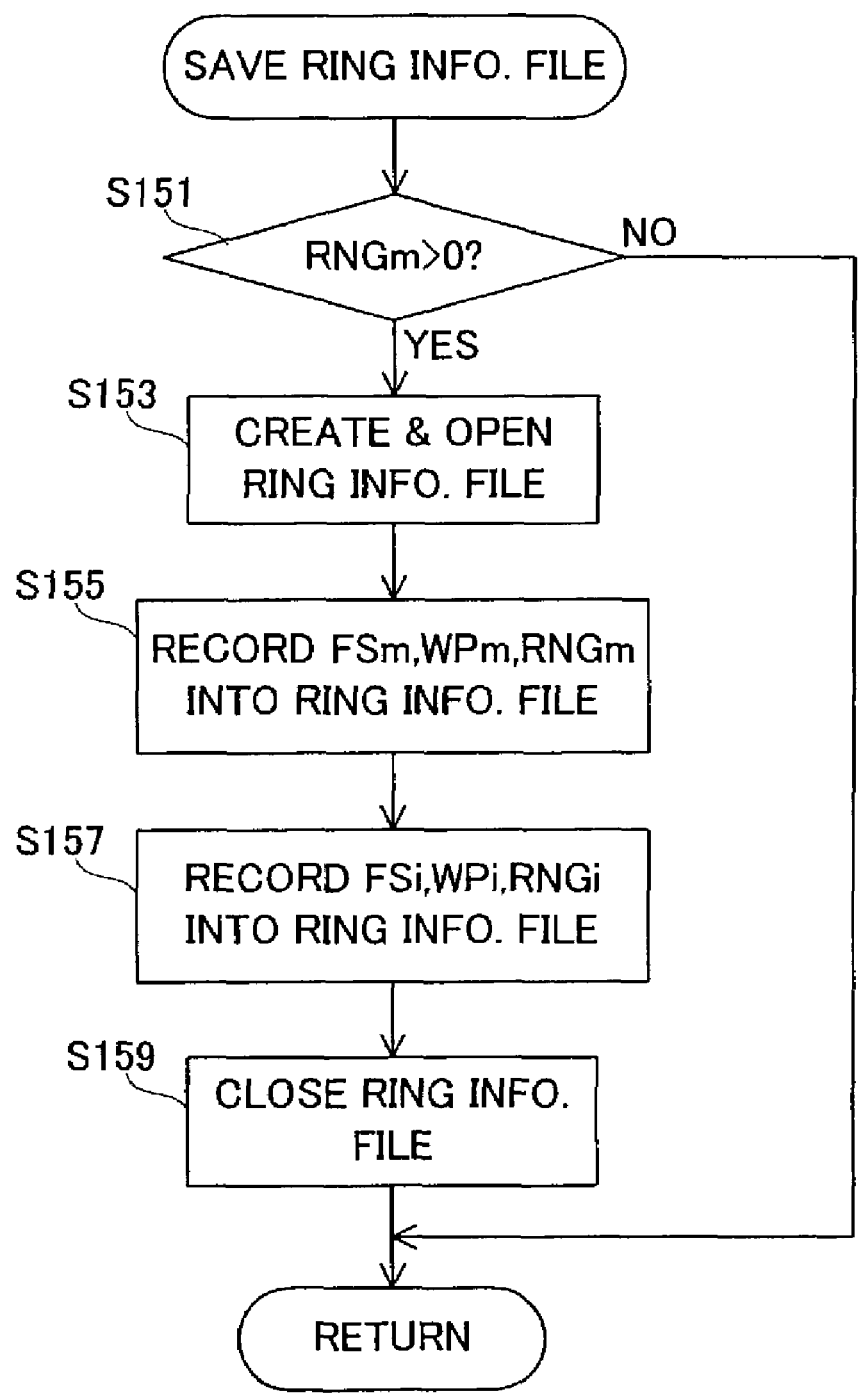
FIG. 10 is a flowchart showing another portion of the operation of FIG. 1 embodiment.

A ring information file saving process in the step S35 shown in FIG. 5 follows a subroutine shown in FIG. 10. Firstly, the variable RNGm is compared with "0" in a step S151, and if RNGm is equal to (=) 0, the process returns to a routine on a higher hierarchy without creating the ring information file. On the other hand, if RNGm is larger than (>)0, the process advances to a step S153 so as to create the ring information file having the file name of "RINGBUFF.loop", and open the ring information file.

In a step S155, the variables FSm, WPm, and RNGm related to the MPEG file are written into the ring information file, and in a step S157, the variables FSi, WPi, and RNGi related to the INDEX file are written into the same ring information file. Upon completion of writing the variables, the ring information file is closed in a step S159, and then, the process returns to a routine on a higher hierarchy.

Figure 11:
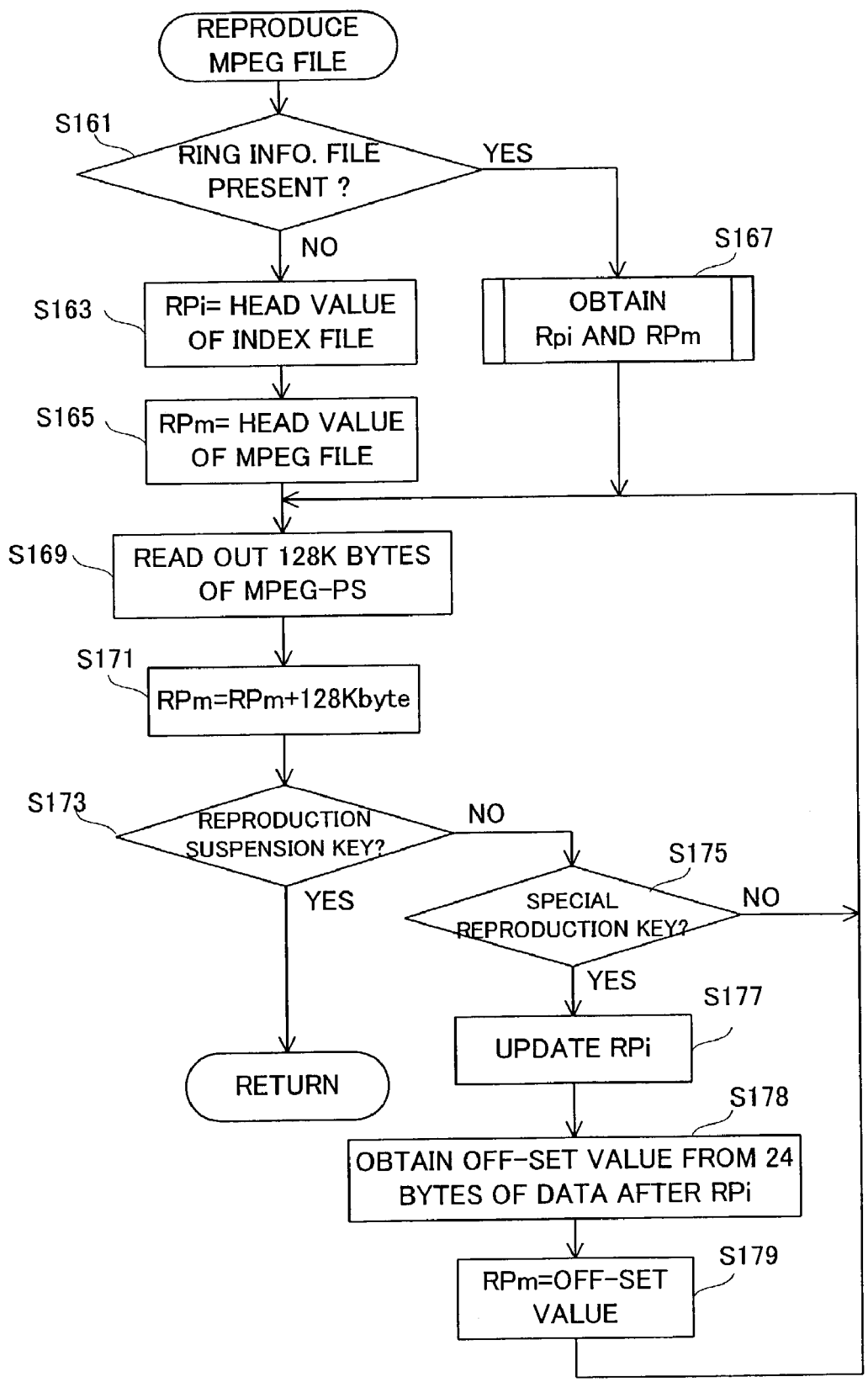
FIG. 11 is a flowchart showing the other portion of the operation of FIG. 1 embodiment.

In a case that a normally saved MPEG file, that is, "SAN****.mpg" is selected, in an MPEG file reproduction process in the step S9 shown in FIG. 3 or the step S47 shown in FIG. 6, the CPU 54 executes a subroutine shown in FIG. 11.

Firstly, in a step S161, it is determined whether or not the ring information file corresponding to a desired MPEG file exists on the hard disk 34. Herein, if NO, the process advances to a step S163 so as to set a head value of the INDEX file corresponding to the desired MPEG file as a variable RPi showing a reading-out location of the index data. In a succeeding step S165, the head value of the desired MPEG file is set to a variable RPm showing the reading-out location of the MPEG-PS file.

Figure 12:
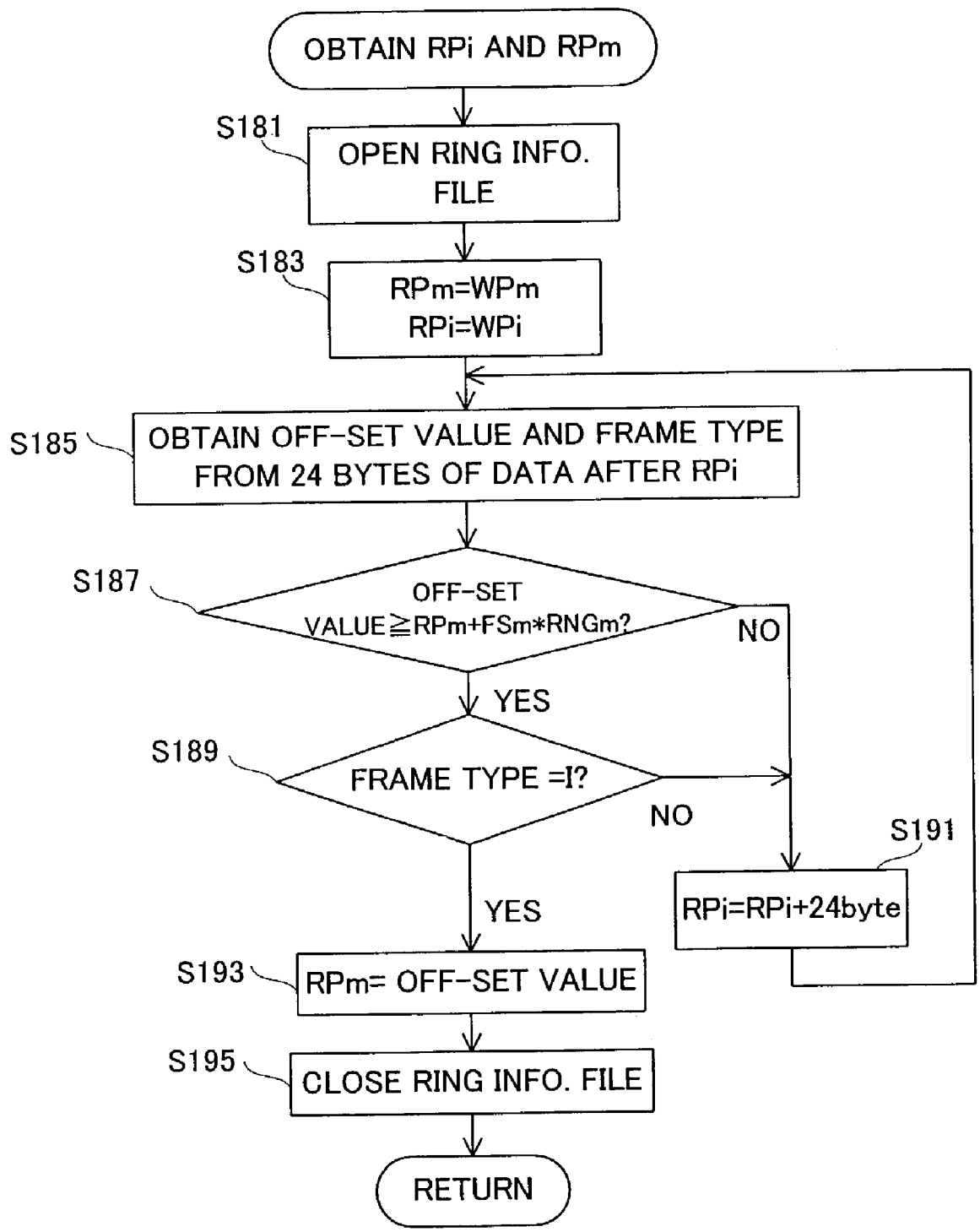
FIG. 12 is a flowchart showing a further portion of the operation of FIG. 1 embodiment.

On the other hand, if YES is determined in the step S161, a subroutine shown in FIG. 12 is processed in a step S167 so as to determine the variables RPi and RPm.

In a step S169, the hard disk 34 is accessed through the HDD 32 so as to read out 128K of the MPEG-PS from a location corresponding to the variable RPm of the desired MPEG file. The read MPEG-PS is accumulated into the MPEG buffer 36, and subjected to a reproduction process. In a step S171, 128K bytes are added to the variable RPm, and it is determined whether or not a key is operated in each of steps S173, and S175. More specifically, it is determined whether or not a reproduction suspension key 56e is operated in a step S173, and it is determined whether or not a special reproduction key 56f is operated in a step S175.

When neither of the reproduction suspension key 56e nor the special reproduction key 56f is operated, the process directly returns to the step S169. As a result, a continuous reproduced video and reproduced sound or voices are output from the television receiver 52.

When the reproduction suspension key 56e is operated, YES is determined in the step S173, and then, the process returns to a routine on a higher hierarchy.

When the special reproduction key 56f is operated, the variable RPi is updated in a step S177, and the off-set value is obtained from 24 bytes of the index data subsequent to a location indicated by the updated variable RPi in a step S178. The obtained off-set value is set as the variable RPm in a step S179, and upon completion of setting, the process returns to the step S169. As a result, a special video such as a fast-forwarding video, a rewinding video, a still video, or the like is output from the television receiver 52.

When moved from the step S167 to a subroutine shown in FIG. 12, firstly, the ring information file is opened in a step S181. In a step S183, the variables WPm and WPi included in the opened ring information file are set as the variables RPm and RPi. In a step S185, the INDEX file corresponding to the desired MPEG file is specified, and the off-set value and the frame type are obtained from 24 bytes subsequent to a location corresponding to the variable RPm of the INDEX file.

In a step S187, it is determined whether or not a condition shown in an equation 1 is satisfied among the variables FSm and RNGm included in the ring information file, the variable RPm set in the step S183, and the off-set value obtained in the step S185.

$$\text{off-set value} \geq RPm + FSm * RNGm \qquad \text{[Equation 1]}$$

The variable FSm indicates a size of the desired MPEG file, the variable RNGm indicates the number of overwritings as to the desired MPEG file, and the variable RPm (=WPm) indicates a next byte of a writing ending location of the desired MPEG file. Each of these variables is a variable showing an actual recording condition in the MPEG file, and "RPm+FSm*RNGm" indicates a head location of the MPEG-PS, which is not overwritten, and remained in the MPEG file.

On the other hand, the off-set value is information obtained from the INDEX file. In view of a fact that both the MPEG file and the INDEX file are the ring files, and the MPEG-PS has a variable bit rate, it is probable that a frame beginning from the off-set value obtained in the step S165 is overwritten by a subsequent MPEG-PS.

Consequently, it is to be determined whether or not the frame beginning from the obtained off-set value is remained in the MPEG file in a step S187.

Figure 17:
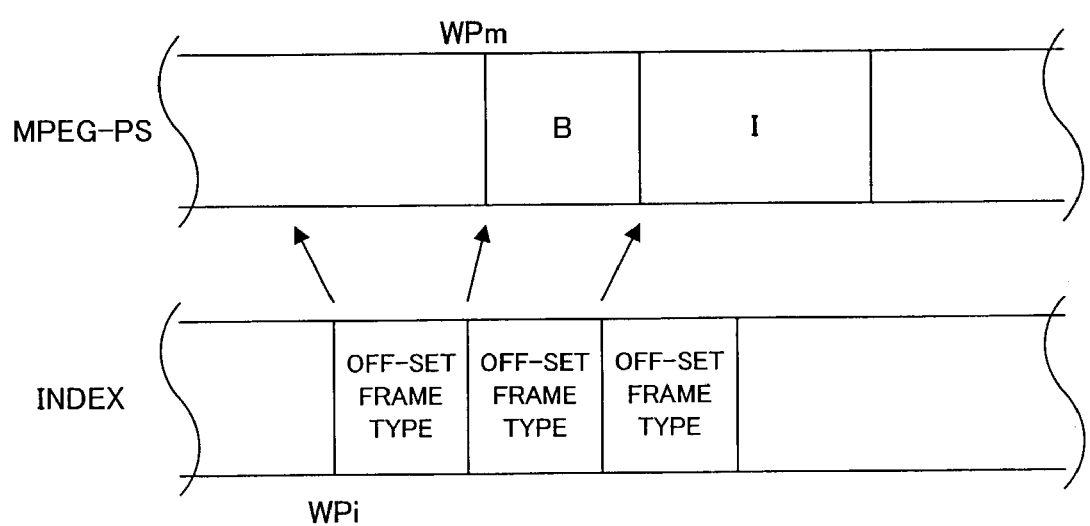
FIG. 17 is an illustrative view showing another portion of the operation of FIG. 1 embodiment.

In the recording condition shown in FIG. 17, the frame corresponding to the off-set value obtained from 24 bytes after the variable WPi is deleted by the overwriting. At this time, the condition of Equation 1 is not satisfied, and NO is determined in the step S187.

If NO is determined in the step S187, 24 bytes are added to the variable RPi in a step S191, and then, the process returns to the step S185. In the step S185, the off-set value and the frame type are obtained from 24 bytes subsequent to the updated variable RPi, and in a succeeding step S187, it is determined whether or not the condition of Equation 1 is satisfied using the newly obtained off-set value, and frame type.

In the recording condition shown in FIG. 17, the frame corresponding to the off-set value obtained from 24 bytes subsequent to the updated variable RPi (=WPi+24 bytes) exists on the MPEG file. At this time, the condition of Equation 1 is satisfied, and YES is determined in the step S187.

If YES is determined in the step S187, the frame type obtained in the immediately preceding step S185 is determined. Then, if the frame type is not "I", the process updates the variable RPi in the step S191 before executing the processes of steps S185-S189 once again.

In the recording condition in FIG. 17, the frame corresponding to the off-set value obtained from 24 bytes subsequent to the variable RPi (=WPi+48 bytes), which is once again updated, is the I picture. Due to this, In the second process of the step S189, YES is determined.

If YES is determined in the step S189, the process advances to a step S193 so as to set the off-set value obtained in the immediately preceding step S185 as the variable RPm. Upon completion of the setting, the ring file information is closed in a step S195 before returning to a routine on a higher hierarchy.

As understood from the above descriptions, the MPEG-PS into which the I picture is intermittently inserted is circularly written into the MPEG file. Furthermore, the index data capable of specifying at least the I picture is circularly written into the INDEX file. The CPU 54 detects the I picture from a head portion of the MPEG-PS based on the index data stored in the INDEX file, and reproduces the MPEG-PS rendering the detected I picture a starting picture. Thus, the I picture is to be specified from the head portion of the MPEG-PS based on the index data stored in the INDEX file so that it is possible to reproduce from the head portion the MPEG-PS stored in the MPEG file in which the writing is circularly carried out.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A content recording apparatus, comprising:
    a first recorder that circularly records a video content having a reference screen that is intermittently defined in a first file;
    a counter that counts the number of times that said first file revolves;
    an accumulated value calculator that calculates an accumulated value of the video content recorded by said first recorder;
    a second recorder that circularly records a recording amount value from a head of the video content to each reference screen forming said reference screen of said video content;
    a termination portion arranger that arranges a termination portion of said first file and a termination portion of said second file to be kept step with each other based on the accumulated value calculated by said accumulated value calculator and a last recording amount value recorded by said second recorder, when the record of said first file is ended;
    a ring information file producer that produces a ring information file including the number of times indicating the times that said first file is revolved and counted by said counter, a file size of said first file, a write end position of said first file and a write end position of said second file, when the record of said first file is ended; and
    a normal recorder that normally records said first file and said second file such that respective termination portions are arranged with each other and the ring information file produced by said ring information producer with being related to each other.

2. A content recording apparatus according to claim 1, wherein the recording amount value from a head of the video content to each reference screen forming said reference screen of said video content is constituted by an offset value from said head of said video content to each reference screen and a data size of said each reference screen.

3. A content recording apparatus according to claim 1, wherein said termination portion arranger includes a comparator that compares the accumulated value calculated by said accumulated value calculator and the last recording amount value recorded by said second recorder, a first additional recorder that additionally records the video content in said first file when a comparison result indicates that said last recording amount value is larger than said accumulating value, and a second additional recorder that additionally records the recording amount value in said second file when a comparison result indicates that said accumulating value is larger than said last recording amount value.

4. A content recording apparatus according to claim 3, wherein the recording amount value from a head of the video content to each reference screen forming said reference screen of said video content is constituted by an offset value from said head of said video content to each reference screen and a data size of said each reference screen.

5. A content recording apparatus according to claim 3, wherein when a comparison result indicates that said accumulating value and said last recording amount value are coincident with each other, said ring information producer produces the ring information file, and said normal recorder normally records said first and second files and the ring information file.

6. A content recording apparatus according to claim 5, wherein the recording amount value from a head of the video content to each reference screen forming said reference screen of said video content is constituted by an offset value from said head of said video content to each reference screen and a data size of said each reference screen.

7. A content reproducing apparatus which reproduces the first file recorded by the content recording apparatus according to claim 6, comprising:
    a decider that decides a read starting position of the second file related to the first file on the basis of the ring information file related to said first file when said first file recorded by said first recorder is reproduced; and
    a reproducing start position specifier that specifies a reproducing start position of said first file based on the offset value included in the recording amount value of the reference screen forming the video content read-out on the basis of the read starting position decided by said decider and the ring information file related to said first file.

8. A content reproducing apparatus according to claim 7, wherein said reproducing start position specifier includes a first determiner that determines whether or not heads of said first file and said second file are in correspondence with each other based on the offset value included in the recording amount value read on the basis of the read start position decided by said decider, and the number of times indicating the times that said first file is revolved, the file size of said first file and the write end position of said first file included in said ring information file, and a second determiner that determines whether video information included in said first file corresponding to said second file is the reference screen at a time that said first determiner determines the heads of said first file and said second file are in correspondence with each other, and when said second determiner determines that the video information included in said first file corresponding to said second file is the reference screen, specifies said reproducing start position of said first file based on the offset value included in the recording amount value of the reference screen forming the video content read-out on the basis of the read starting position decided by said decider and the ring information file related to said first file.

9. A content reproducing apparatus according to claim 8, wherein said reproducing start position specifier further includes a changer that changes the read start position of said second file when said first determiner determines the heads of said first and second files are not in correspondence to each other, or said second determiner determines that the video information corresponding to said second file is not the reference screen.

* * * * *